(12) United States Patent
Gupta et al.

(10) Patent No.: US 10,477,580 B2
(45) Date of Patent: Nov. 12, 2019

(54) COLLISION DEADLOCK RESOLUTION

(71) Applicant: QUALCOMM Incorporated, San Diego, CA (US)

(72) Inventors: Piyush Gupta, Bridgewater, NJ (US); Chong Li, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 15/264,415

(22) Filed: Sep. 13, 2016

(65) Prior Publication Data

US 2017/0311351 A1    Oct. 26, 2017

Related U.S. Application Data

(60) Provisional application No. 62/325,203, filed on Apr. 20, 2016.

(51) Int. Cl.
*H04W 72/04* (2009.01)
*H04W 74/08* (2009.01)
(Continued)

(52) U.S. Cl.
CPC ........ *H04W 74/0816* (2013.01); *H04W 4/70* (2018.02); *H04W 48/16* (2013.01); *H04W 72/04* (2013.01); *H04W 74/08* (2013.01); *H04W 8/005* (2013.01); *H04W 48/08* (2013.01); *H04W 74/085* (2013.01); *H04W 84/18* (2013.01)

(58) Field of Classification Search
None
See application file for complete search history.

(56) References Cited

U.S. PATENT DOCUMENTS

2013/0114526 A1* 5/2013 Ahn ................ H04W 40/246
                                                    370/329
2014/0018077 A1* 1/2014 Zhong ............ H04W 52/0206
                                                    455/436
(Continued)

FOREIGN PATENT DOCUMENTS

EP       3038420 A2    6/2016
WO   WO-2015043465 A2  4/2015

OTHER PUBLICATIONS

International Search Report and Written Opinion—PCT/US2017/027747—ISA/EPO—dated Sep. 29, 2017.

*Primary Examiner* — Suhail Khan
(74) *Attorney, Agent, or Firm* — Loza & Loza, LLP

(57) ABSTRACT

A user equipment (UE) may, in a first discovery frame, determine whether a discovery resource is available for communication. If the discovery resource is available for communication, the UE may, in a second discovery frame following the first discovery frame, transmit a discovery signal using the discovery resource and puncture the discovery signal during a listening window. The UE may detect the energy of a received signal at the discovery resource during the listening window. The UE may abandon the discovery resource if the detected energy is above a threshold. In some example, the listening window may have a fixed duration and a beginning that is randomly selected from a predetermined set of values. In some example, the listening window may have a variable duration and an end that matches an end of the second discovery frame.

26 Claims, 11 Drawing Sheets

(51) Int. Cl.
    *H04W 48/16*     (2009.01)
    *H04W 4/70*     (2018.01)
    *H04W 8/00*     (2009.01)
    *H04W 48/08*     (2009.01)
    *H04W 84/18*     (2009.01)

(56) References Cited

U.S. PATENT DOCUMENTS

| | | | |
|---|---|---|---|
| 2015/0245235 A1* | 8/2015 | Tang | H04W 36/0088 370/252 |
| 2015/0358800 A1 | 12/2015 | Park et al. | |
| 2015/0365918 A1 | 12/2015 | Blankenship et al. | |
| 2017/0289869 A1* | 10/2017 | Nogami | H04W 36/0066 |

* cited by examiner

COLLISION DEADLOCK RESOLUTION

CROSS-REFERENCE TO RELATED APPLICATIONS

The present application for patent claims priority to U.S. Provisional Application No. 62/325,203, titled "COLLISION DEADLOCK RESOLUTION" filed Apr. 20, 2016, and assigned to the assignee hereof and hereby expressly incorporated by reference herein as if fully set forth below and for all applicable purposes.

TECHNICAL FIELD

The technology discussed herein relates, generally, to wireless communication systems, and, more particularly, to resolving collision deadlocks between two or more wireless communication devices.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

In some examples, such wireless communication networks may include a mesh network of devices. Such devices may sometimes be referred to as Internet of Things (IoT) devices or Internet of Everything (IoE) devices. These devices may discover each other during their respective awake states, but their discovery procedures may not be aided by explicit feedback mechanisms (e.g., request-to-send (RTS)/request-to-send (CTS) protocols). In some circumstances, a device may mistakenly believe that a radio resource is available for communication and thereby transmit a discovery signal that collides with a discovery signal of another device. However, such collisions may be unknown to those devices and, therefore, the transmission of colliding discovery signals may persist, thereby rendering those devices in a collision deadlock.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of wireless communication. The method may include, in a first discovery frame, determining whether a discovery resource is available for communication. If the discovery resource is available for communication, the method may also include, in a second discovery frame following the first discovery frame, transmitting a discovery signal using the discovery resource and puncturing the discovery signal during a listening window. The method may also include detecting the energy of a received signal at the discovery resource during the listening window. The method may also include abandoning the discovery resource if the detected energy is above a first threshold.

In some aspects, the present disclosure also provides an apparatus for wireless communication that includes a processor, a transceiver communicatively coupled to the at least one processor, and a memory communicatively coupled to the at least one processor. The processor may be configured to, in a first discovery frame, determine whether a discovery resource is available for communication. If the discovery resource is available for communication, the processor may be further configured to, in a second discovery frame following the first discovery frame, transmit a discovery signal using the discovery resource and puncture the discovery signal during a listening window. The processor may be further configured to detect the energy of a received signal at the discovery resource during the listening window. The processor may be further configured to abandon the discovery resource if the detected energy is above a first threshold.

In some aspects, the present disclosure also provides a non-transitory computer-readable medium storing computer-executable code comprising instructions. The instructions may be configured to, in a first discovery frame, determine whether a discovery resource is available for communication. If the discovery resource is available for communication, the instructions may be further configured to, in a second discovery frame following the first discovery frame, transmit a discovery signal using the discovery resource and puncture the discovery signal during a listening window. The instructions may be further configured to detect the energy of a received signal at the discovery resource during the listening window. The instructions may be further configured to abandon the discovery resource if the detected energy is above a first threshold.

In some aspects, the present disclosure also provides another apparatus for wireless communication. The apparatus may include a means for determining, in a first discovery frame, whether a discovery resource is available for communication. If the discovery resource is available for communication, the apparatus may also include a means for transmitting, in a second discovery frame following the first discovery frame, a discovery signal using the discovery resource and puncturing the discovery signal during a listening window. The apparatus may also include a means for detecting the energy of a received signal at the discovery resource during the listening window. The apparatus may also include a means for abandoning the discovery resource if the detected energy is above a first threshold.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
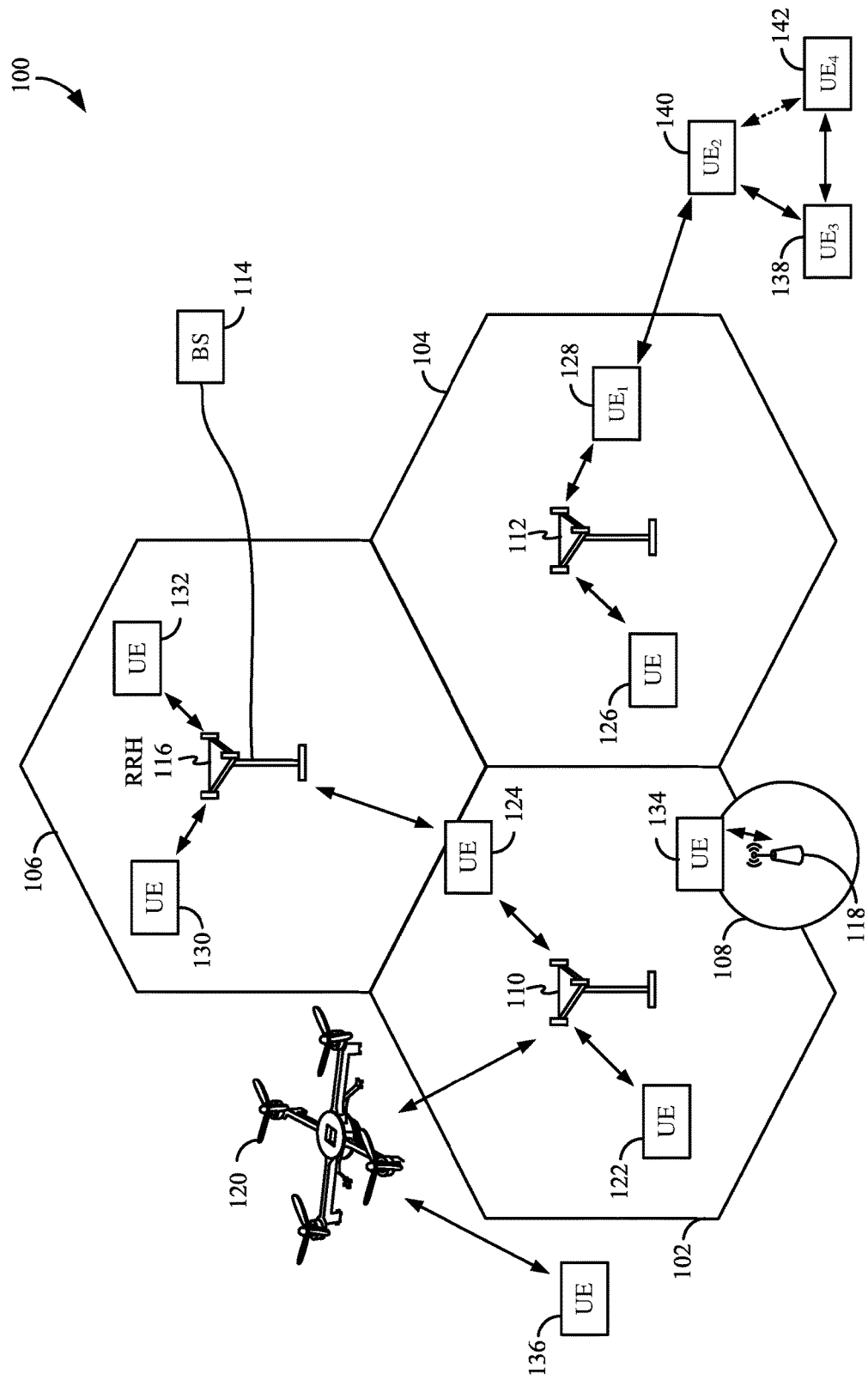
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The geographic region covered by the access network 100 may be divided into a number of cellular regions (cells), including macrocells 102, 104, 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110, 112 are shown in certain cells 102, 104 and a third high-power base station 114 is shown controlling a remote radio head (RRH) 116 in cell 106. In this example, the cells 102, 104, 106 may be referred to as macrocells, as the high-power base stations 110, 112, 114 support cells having a large size. Further, a low-power base station 118 is shown in the small cell 108 (e.g., a microcell, picocell, femtocell, home base station, home NB, home eNB, etc.), which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and/or cells. The base stations 110, 112, 114, 118 provide wireless access points to a core network for any number of mobile apparatuses.

FIG. 1 further includes a multicopter 120 (e.g., quadcopter, drone, etc.), which may be configured to function as a base station. That is, in some examples, a cell may not necessarily be stationary, and the geographic area of the cell may move according to the location of a mobile base station, such as the multicopter 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated as supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multicopter, a quadcopter, a smart energy or security device, municipal lighting, water, or other infrastructure, industrial automation and enterprise devices, consumer and wearable devices (such as eyewear, a wearable camera, a smart watch, a health or fitness tracker, a digital audio player (e.g., MP3 player), a camera, a game console, etc.), and digital home or smart home devices (such as a home audio, video, and multimedia device, an appliance, a sensor, a vending machine, intelligent lighting, a home security system, a smart meter, etc.).

Within the access network 100, the cells may include UEs that may be in communication with one or more sectors of each cell. For example, UE(s) 122, 124 may be in communication with base station 110; UE(s) 126, 128 may be in communication with base station 112; UE(s) 130, 132 may be in communication with base station 114 by way of RRH 116; UE(s) 134 may be in communication with low-power base station 118; and UE(s) 136 may be in communication with multicopter 120. Here, each base station 110, 112, 114, 118, 120 may be configured to provide an access point to a core network (not shown) for all the UEs in the respective cells. In another example, the multicopter 120 may be configured to function as a UE. For example, the multicopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, some UE(s) 138 may communicate with other UE(s) 140, 142. In this example, some UE(s) 138 may be functioning as a scheduling entity, and other UE(s) 140, 142 may utilize resources scheduled by such UE(s) 138 for wireless communication. A UE may function as a scheduling entity in a peer-to-peer (P2P) network, and/or in a mesh network. In a mesh network example, UEs 140, 142 may optionally communicate directly with one another in addition to communicating with the scheduling entity 138. Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some examples, one or more of the UEs (e.g., $UE_1$ 128) may operate as a relay. As a relay, such UE(s) (e.g., $UE_1$ 128) may receive a communication from one or more other UE(s) (e.g., $UE_2$ 140) and relay (e.g., forward, transmit, distribute, etc.) that communication to one or more other apparatus (e.g., base station 112). A mesh network may include any number of UEs that operate as relays without deviating from the scope of the present disclosure. Additional description pertaining to such operations is provided herein.

Figure 2:
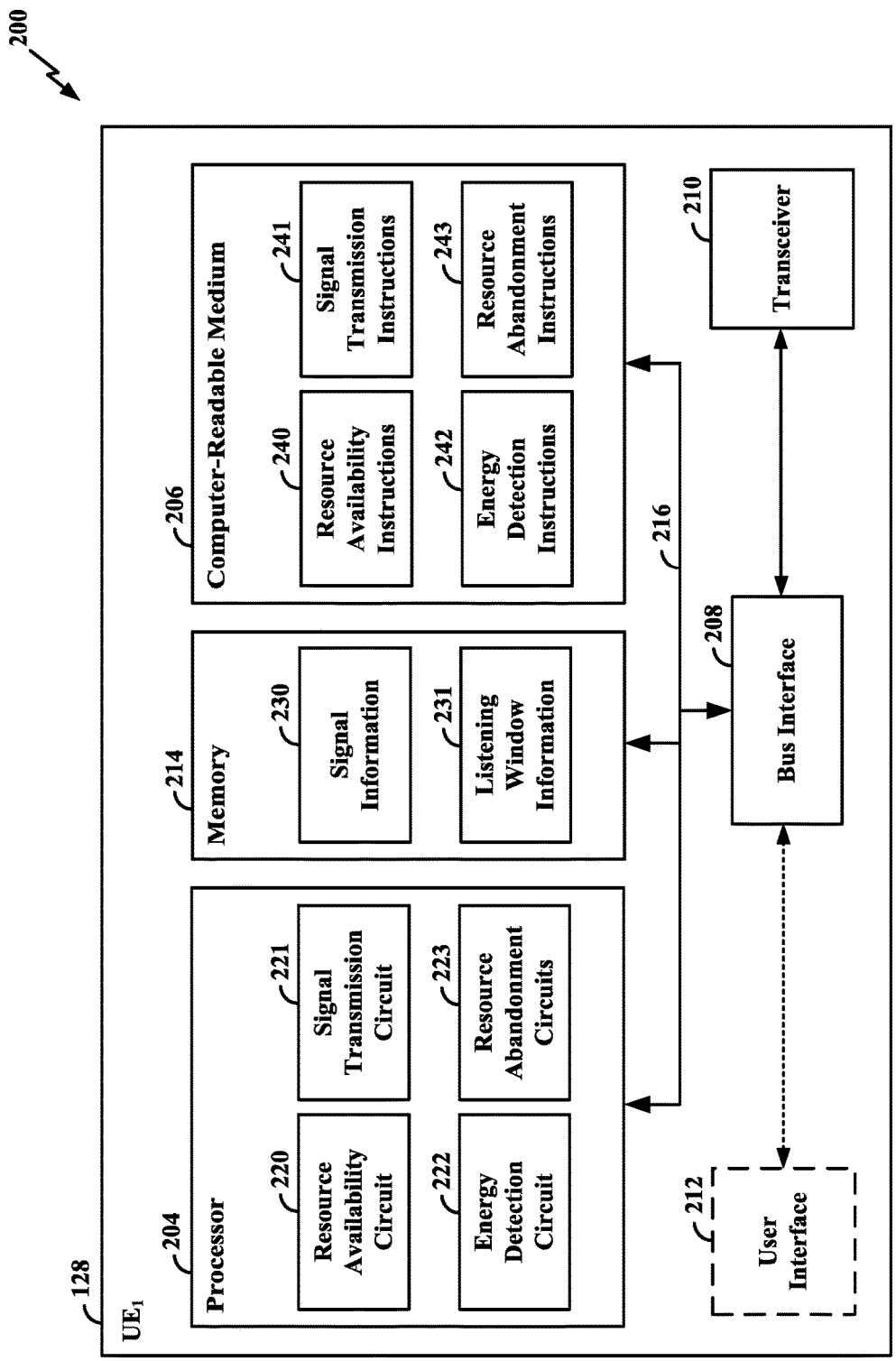
FIG. 2 is a diagram illustrating an example of a hardware implementation for a user equipment (UE) according to some aspects of the present disclosure.

FIG. 2 is a diagram 200 illustrating an example of a hardware implementation of the $UE_1$ 128 according to various aspects of the present disclosure. The $UE_1$ 128 may include a user interface 212. The user interface 212 may be configured to receive one or more inputs from a user of the $UE_1$ 128. In some configurations, the user interface 212 may be a keypad, a display, a speaker, a microphone, a joystick, and/or any other suitable component of the $UE_1$ 128. The user interface 212 may exchange data via the bus interface 208. The $UE_1$ 128 may also include a transceiver 210. The transceiver 210 may be configured to receive data and/or transmit data in communication with another apparatus. The transceiver 210 provides a means for communicating with another apparatus via a wired or wireless transmission medium. The transceiver 210 may be configured to perform such communications using various types of technologies without deviating from the scope of the present disclosure.

The $UE_1$ 128 may also include a memory 214, one or more processors 204, a computer-readable medium 206, and a bus interface 208. The bus interface 208 may provide an interface between a bus 216 and the transceiver 210. The memory 214, the one or more processors 204, the computer-readable medium 206, and the bus interface 208 may be connected together via the bus 216. The processor 204 may be communicatively coupled to the transceiver 210 and/or the memory 214.

The processor 204 may include a resource availability circuit 220. The resource availability circuit 220 may include hardware components and/or may perform various algorithms that provide the means for determining whether a discovery resource is available for communication in a first discovery frame. The processor 204 may also include a signal transmission circuit 221. If the discovery resource is available for communication, the signal transmission circuit 221 may provide the means for transmitting, in a second discovery frame following the first discovery frame, a discovery signal using the discovery resource and puncturing the discovery signal during a listening window. The processor 204 may also include an energy detection circuit 222. The energy detection circuit 222 may include various hardware components and/or may perform various algorithms that provide the means for detecting the energy of a received signal at the discovery resource during the listening window. The processor 204 may also include a resource abandonment circuit 223. If the detected energy is above a first threshold, the resource abandonment circuit 223 may include various hardware components and/or may perform various algorithms that provide the means for abandoning the discovery resource. If the detected energy is not above the first threshold, the signal transmission circuit 221 may include various hardware components and/or may perform various algorithms that provide the means for resuming the transmission of the discovery signal using the discovery resource.

The foregoing description provides a non-limiting example of the processor 204 of the $UE_1$ 128. Although various circuits 220, 221, 222, 223 are described above, one of ordinary skill in the art will understand that the processor 204 may also include various other circuits (not shown) that are in addition and/or alternative(s) to the aforementioned circuits 220, 221, 222, 223. Such other circuits (not shown) may provide the means for performing any one or more of the functions, methods, processes, features and/or aspects described herein.

The computer-readable medium 206 may include various computer-executable instructions. The computer-executable instructions may include computer-executable code configured to perform various functions and/or enable various aspects described herein. The computer-executable instructions may be executed by various hardware components (e.g., the processor 204 and/or any of its circuits 220, 221, 222, 223) of the $UE_1$ 128. The computer-executable instructions may be a part of various software programs and/or software modules. The computer-readable medium 206 may include resource availability instructions 240. In some configurations, the resource availability instructions 240 may include computer-executable instructions configured for determining whether a discovery resource is available for communication in a first discovery frame. The computer-readable medium 206 may also include signal transmission instructions 241. If the discovery resource is available for communication, the signal transmission instructions 241 may include computer-executable instructions configured for transmitting, in a second discovery frame following the first discovery frame, a discovery signal using the discovery resource and puncturing the discovery signal during a listening window. The computer-readable medium 206 may also include energy detection instructions 242. In some configurations, the energy detection instructions 242 may include computer-executable instructions configured for detecting the energy of a received signal at the discovery resource during the listening window. The computer-readable medium 206 may also include resource abandonment instructions 243. If the detected energy is above a first threshold, the resource abandonment instructions 243 may include computer-executable instructions configured for abandoning the discovery resource.

The foregoing description provides a non-limiting example of the computer-readable medium 206 of the $UE_1$ 128. Although various computer-executable instructions 240, 241, 242, 243 are described above, one of ordinary skill in the art will understand that the computer-readable medium 206 may also include various other computer-executable instructions (not shown) that are in addition and/or alternative(s) to the aforementioned computer-executable instructions 240, 241, 242, 243. Such other computer-executable instructions (not shown) may be configured for any one or more of the functions, methods, processes, features and/or aspects described herein.

The memory 214 may include various memory modules. The memory modules may be configured to store, and have read therefrom, various values and/or information by the processor 204, or any of its circuits 220, 221, 222, 223. The memory modules may also be configured to store, and have read therefrom, various values and/or information upon execution of the computer-executable code included in the computer-readable medium 206, or any of its instructions 240, 241, 242, 243. The memory 214 may include signal information 230. The signal information 230 may include various types, quantities, configurations, arrangements, and/or forms of information related to any discovery signal described in greater detail herein. In some examples, the discovery signal may be a discovery broadcast. In some examples, the discovery signal may be a discovery multicast.

The memory 214 may also include listening window information 231. The listening window information 231 may include various types, quantities, configurations, arrangements, and/or forms of information related to any listening window described in greater detail herein. In some examples, the listening window may have a fixed duration and a beginning that is randomly selected from a predetermined set of values. In some examples, the listening window may have a variable duration and an end that matches an end of the second discovery frame. In some examples, the listening window may occur after a data portion of the second discovery frame. In some examples, a periodicity of the listening window may be associated with a likelihood of a collision deadlock. The foregoing description provides a non-limiting example of the memory 214 of the $UE_1$ 128. Although various types of data of the memory 214 are described above, one of ordinary skill in the art will understand that the memory 214 may also include various other data that are in addition and/or alternative(s) to the aforementioned information 230, 231. Such other data may be associated with any one or more of the functions, methods, processes, features and/or aspects described herein.

One of ordinary skill in the art will also understand that the $UE_1$ 128 may include alternative and/or additional features without deviating from the scope of the present disclosure. In accordance with various aspects of the present disclosure, an element, or any portion of an element, or any combination of elements may be implemented with a processing system that includes one or more processors 204. Examples of the one or more processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 216 and bus interface 208. The bus 216 may include any number of interconnecting buses and bridges depending on the specific application of the processing system and the overall design constraints. The bus 216 may link together various circuits including the one or more processors 204, the memory 214, and the computer-readable medium 206. The bus 216 may also link various other circuits such as timing sources, peripherals, voltage regulators, and power management circuits.

The one or more processors 204 may be responsible for managing the bus 216 and general processing, including the execution of software stored on the computer-readable medium 206. The software, when executed by the one or more processors 204, causes the processing system to perform the various functions described below for any one or more apparatuses. The computer-readable medium 206 may also be used for storing data that is manipulated by the one or more processors 204 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 206.

The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may also include, by way of example, a carrier wave, a transmission line, and any other suitable medium for transmitting software and/or instructions that may be accessed and read by a computer. The computer-readable medium 206 may reside in the processing system, external to the processing system, or distributed across multiple entities including the processing system. The computer-readable medium 206 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 3:
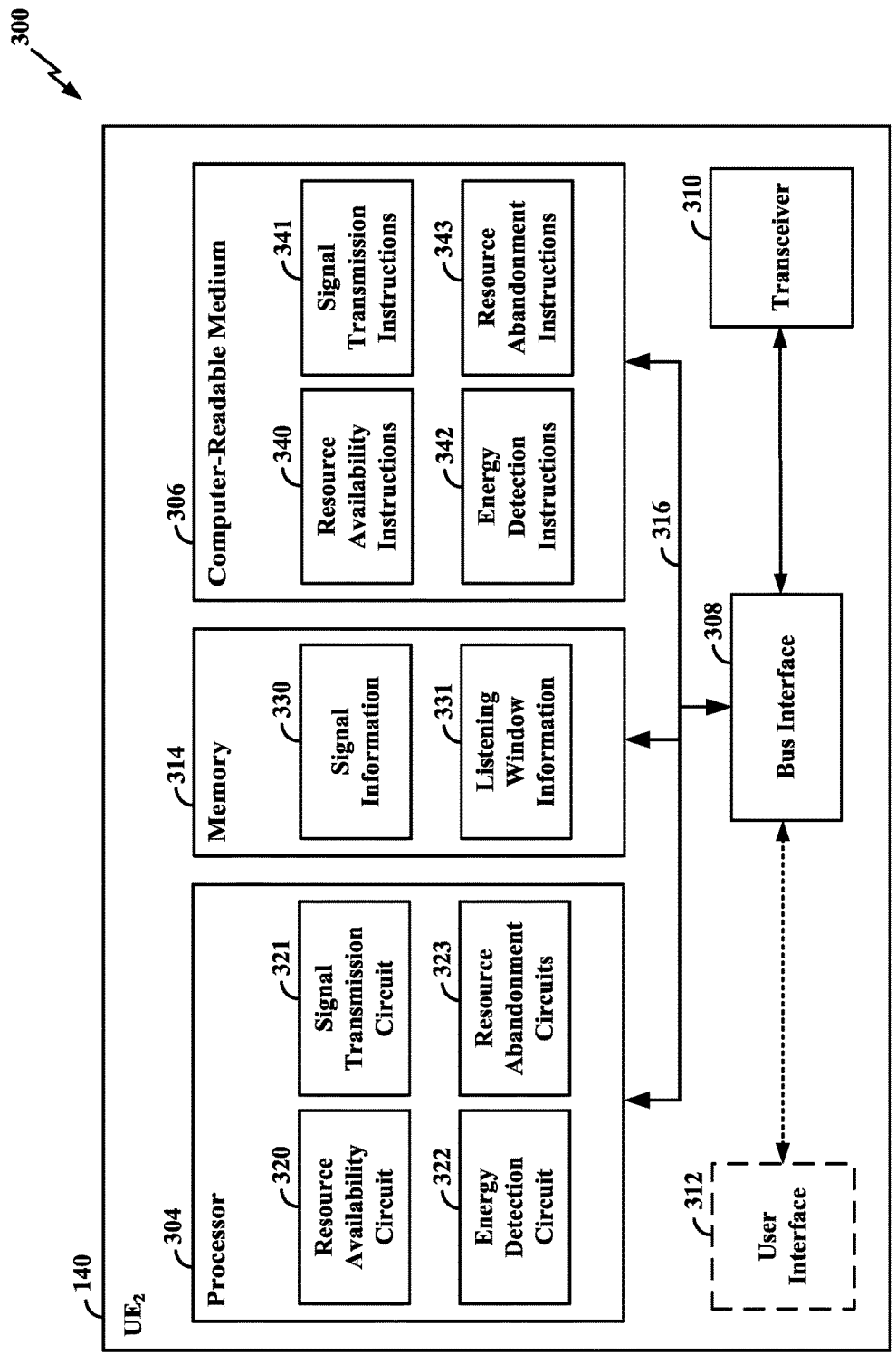
FIG. 3 is a diagram illustrating an example of a hardware implementation for another UE according to some aspects of the present disclosure.

FIG. 3 is a diagram 300 illustrating an example of a hardware implementation of the $UE_2$ 140 according to various aspects of the present disclosure. The $UE_2$ 140 may include a user interface 312. The user interface 312 may be configured to receive one or more inputs from a user of the $UE_2$ 140. In some configurations, the user interface 312 may be a keypad, a display, a speaker, a microphone, a joystick, and/or any other suitable component of the $UE_2$ 140. The user interface 312 may exchange data via the bus interface 308. The $UE_2$ 140 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may be configured to perform such communications using various types of technologies without deviating from the scope of the present disclosure.

The $UE_2$ 140 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may include a resource availability circuit 320. The resource availability circuit 320 may include hardware components and/or may perform various algorithms that provide the means for determining whether a discovery resource is available for communication in a first discovery frame. The processor 304 may also include a signal transmission circuit 321. If the discovery resource is available for communication, the signal transmission circuit 321 may provide the means for transmitting, in a second discovery frame following the first discovery frame, a discovery signal using the discovery resource and puncturing the discovery signal during a listening window. The processor 304 may also include an energy detection circuit 322. The energy detection circuit 322 may include various hardware components and/or may perform various algorithms that provide the means for detecting the energy of a received signal at the discovery resource during the listening window. The processor 304 may also include a resource abandonment circuit 323. If the detected energy is above a first threshold, the resource abandonment circuit 323 may include various hardware components and/or may perform various algorithms that provide the means for abandoning the discovery resource. If the detected energy is not above the first threshold, the signal transmission circuit 321 may include various hardware components and/or may perform various algorithms that provide the means for resuming the transmission of the discovery signal using the discovery resource.

The foregoing description provides a non-limiting example of the processor 304 of the $UE_2$ 140. Although various circuits 320, 321, 322, 323 are described above, one of ordinary skill in the art will understand that the processor 304 may also include various other circuits (not shown) that are in addition and/or alternative(s) to the aforementioned circuits 320, 321, 322, 323. Such other circuits (not shown) may provide the means for performing any one or more of the functions, methods, processes, features and/or aspects described herein.

The computer-readable medium 306 may include various computer-executable instructions. The computer-executable instructions may include computer-executable code configured to perform various functions and/or enable various aspects described herein. The computer-executable instructions may be executed by various hardware components (e.g., the processor 304 and/or any of its circuits 320, 321, 322, 323) of the $UE_2$ 140. The computer-executable instructions may be a part of various software programs and/or software modules. The computer-readable medium 306 may include resource availability instructions 340. In some configurations, the resource availability instructions 340 may include computer-executable instructions configured for determining whether a discovery resource is available for communication in a first discovery frame. The computer-readable medium 306 may also include signal transmission instructions 341. If the discovery resource is available for communication, the signal transmission instructions 341 may include computer-executable instructions configured for transmitting, in a second discovery frame following the first discovery frame, a discovery signal using the discovery resource and puncturing the discovery signal during a listening window. The computer-readable medium 306 may also include energy detection instructions 342. In some configurations, the energy detection instructions 342 may include computer-executable instructions configured for detecting the energy of a received signal at the discovery resource during the listening window. The computer-readable medium 306 may also include resource abandonment instructions 343. If the detected energy is above a first threshold, the resource abandonment instructions 343 may include computer-executable instructions configured for abandoning the discovery resource.

The foregoing description provides a non-limiting example of the computer-readable medium 306 of the $UE_2$ 140. Although various computer-executable instructions 340, 341, 342, 343 are described above, one of ordinary skill in the art will understand that the computer-readable medium 306 may also include various other computer-executable instructions (not shown) that are in addition and/or alternative(s) to the aforementioned computer-executable instructions 340, 341, 342, 343. Such other computer-executable instructions (not shown) may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include signal information 330. The signal information 330 may include various types, quantities, configurations, arrangements, and/or forms of information related to any discovery signal described in greater detail herein. In some examples, the discovery signal may be a discovery broadcast. In some examples, the discovery signal may be a discovery multicast.

The memory 314 may also include listening window information 331. The listening window information 331 may include various types, quantities, configurations, arrangements, and/or forms of information related to any listening window described in greater detail herein. In some examples, the listening window may have a fixed duration and a beginning that is randomly selected from a predetermined set of values. In some examples, the listening window may have a variable duration and an end that matches an end of the second discovery frame. In some examples, the listening window may occur after a data portion of the second discovery frame. In some examples, a periodicity of the listening window may be associated with a likelihood of a collision deadlock. The foregoing description provides a non-limiting example of the memory 314 of the $UE_2$ 140. Although various types of data of the memory 314 are described above, one of ordinary skill in the art will understand that the memory 314 may also include various other data that are in addition and/or alternative(s) to the aforementioned information 330, 331. Such other data may be associated with any one or more of the functions, methods, processes, features and/or aspects described herein.

One of ordinary skill in the art will also understand that the $UE_2$ 140 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
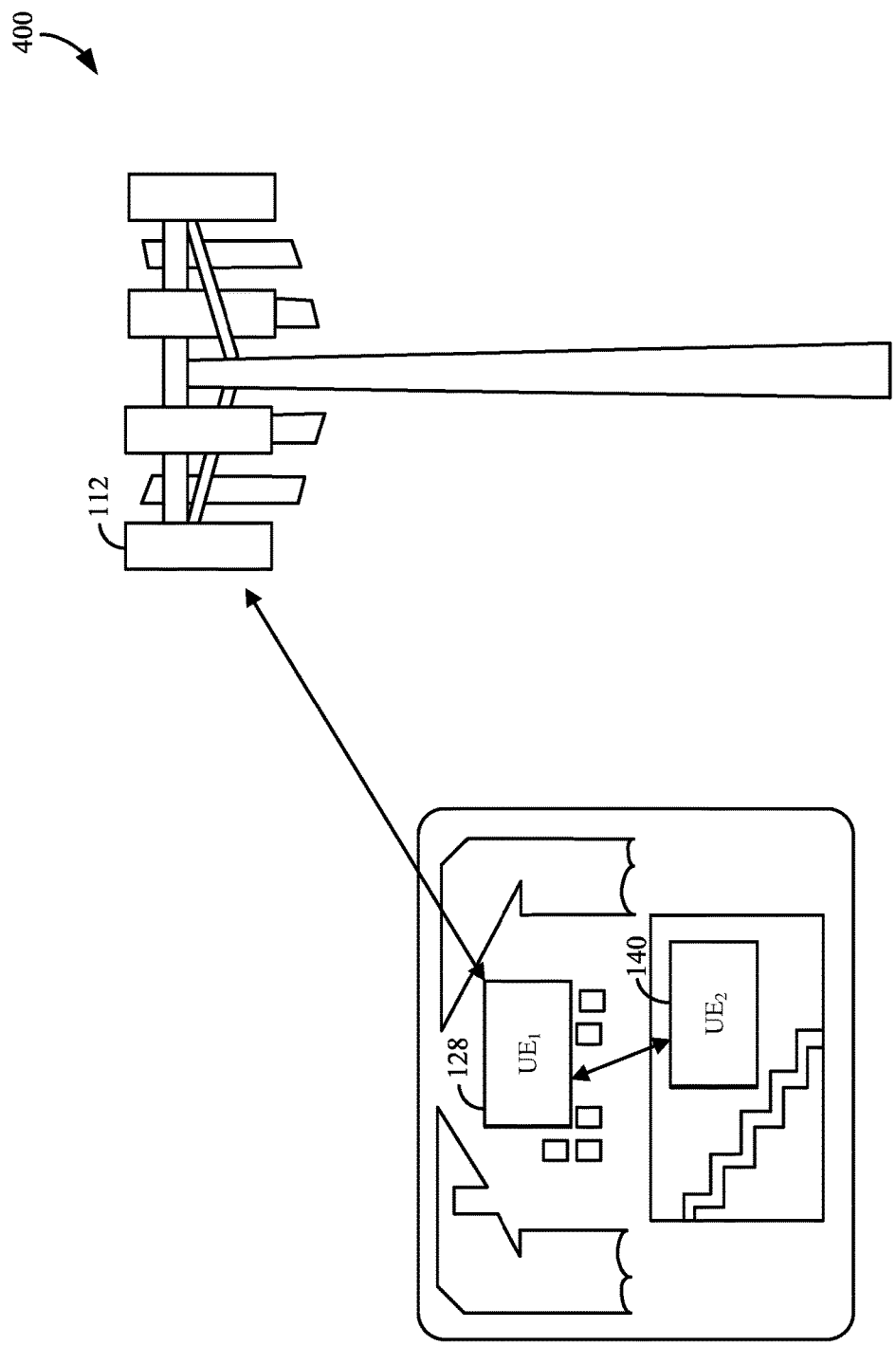
FIG. 4 is a diagram illustrating another example of an access network according to some aspects of the present disclosure.

FIG. 4 is a diagram 400 illustrating another example of an access network according to some aspects of the present disclosure. This example illustrates two devices ($UE_1$ 128, $UE_2$ 140), although additional devices (not shown) may also be implemented without necessarily deviating from the scope of the present disclosure. $UE_1$ 128 and $UE_2$ 140 may sometimes be referred to as IoT devices, IoE devices, and/or any other suitable terminology without necessarily deviating from the scope of the present disclosure.

In this example, $UE_2$ 140 is located in a basement of a residential structure, and $UE_1$ 128 is located above the basement of the residential structure. The basement of the residential structure may be characterized as a coverage-challenged location because its surrounding obstructions (e.g., concrete, walls, etc.) may impede the propagation of signals to and/or from the UE$_2$ 140. Accordingly, UE$_2$ 140 may experience relatively high path loss and relatively high power consumption for communications with the base station 112. In comparison, however, UE$_1$ 128 may experience relatively low path loss and relatively low power consumption for transmission to the base station 112 because it is located above the basement of the residential structure. Accordingly, UE$_2$ 140 may benefit from communicating information to UE$_1$ 128, which can then relay that information to the base station 112.

Figure 5:
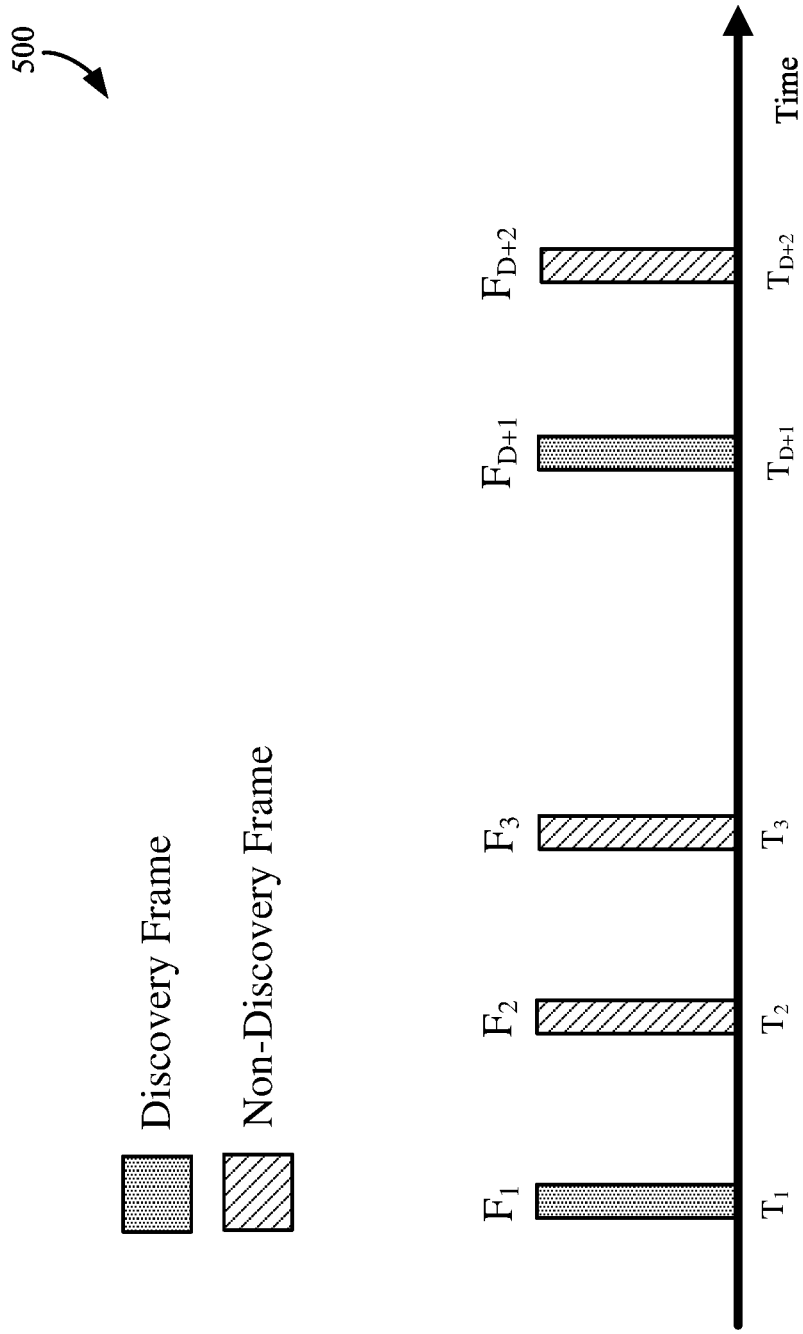
FIG. 5 is a diagram illustrating an example of various communications according to some aspects of the present disclosure.

FIG. 5 is a diagram 500 illustrating an example of various communications according to some aspects of the present disclosure. More specifically, FIG. 5 illustrates communication of various frames (e.g., $F_1$, $F_2$, $F_3$, $F_{D+1}$, $F_{D+2}$) at various times (e.g., $T_1$, $T_2$, $T_3$, $T_{D+1}$, $T_{D+2}$, respectively). Before UE$_1$ 128 can operate as a relay for UE$_2$ 140, UE$_2$ 140 must discover UE$_1$ 128 and its capabilities (e.g., as a relay). In some examples, UE$_1$ 128 and UE$_2$ 140 may be battery-operated and may have an expected battery life of one or more months or years. To conserve power, UE$_1$ 128 and UE$_2$ 140 may be in a sleep state (e.g., relatively low-power state or no-power state) during certain periods of time and only periodically in an awake state (e.g., relatively high-power state). In the example illustrated in FIG. 5, the awake states are illustrated as occurring at times $T_1$, $T_2$, $T_3$, $T_{D+1}$, $T_{D+2}$. During the awake states, UE$_1$ 128 and/or UE$_2$ 140 may transmit various frames (e.g., $F_1$, $F_2$, $F_3$, $F_{D+1}$, $F_{D+2}$). Some frames may be discovery frames (e.g., $F_1$, $F_{D+1}$) and some frame may be non-discovery frames ($F_2$, $F_3$, $F_{D+2}$).

The discovery frames may occur during discovery periods that are separated in time by a particular duration (D). For example, in FIG. 5, a first discovery frame ($F_D$) occurs at time $T_1$, and a second discovery frame ($F_{D+1}$) occurs after a duration (D) (e.g., $T_{D+1}$). In some examples, non-discovery frames may include data (e.g., information relayed by UE$_1$ 128 from UE$_2$ 140 to base station 112). Generally, a 'discovery frame' may refer to a frame, packet, and/or any other suitable encapsulation of one or more signals that are configured to enable the discovery of one apparatus by one or more other apparatuses. For example, a UE may transmit a discovery frame to enable one or more other apparatuses to discover the presence, characteristics, parameters, and/or capabilities (e.g., as a relay, etc.) of the apparatus that transmitted that discovery frame.

In some configurations, the scheduling of the sleep states, awake states, discovery periods, and other related aspects may be controlled by the base station 112 (e.g., eNB). The duration (D) between discovery periods may have various values without deviating from the scope of the present disclosure. When the value of the duration (D) is relatively high, the discovery frame may be communicated relatively less frequently, thereby resulting in relatively low power consumption and relatively low discoverability (e.g., relatively fewer opportunities for UE$_2$ 140 to discover UE$_1$ 128). When the value of the duration (D) is relatively low, the discovery frame may be communicated relatively more frequently, thereby resulting in relatively high power consumption and relatively high discoverability (e.g., relatively greater opportunities for UE$_2$ 140 to discover UE$_1$ 128).

Figure 6:
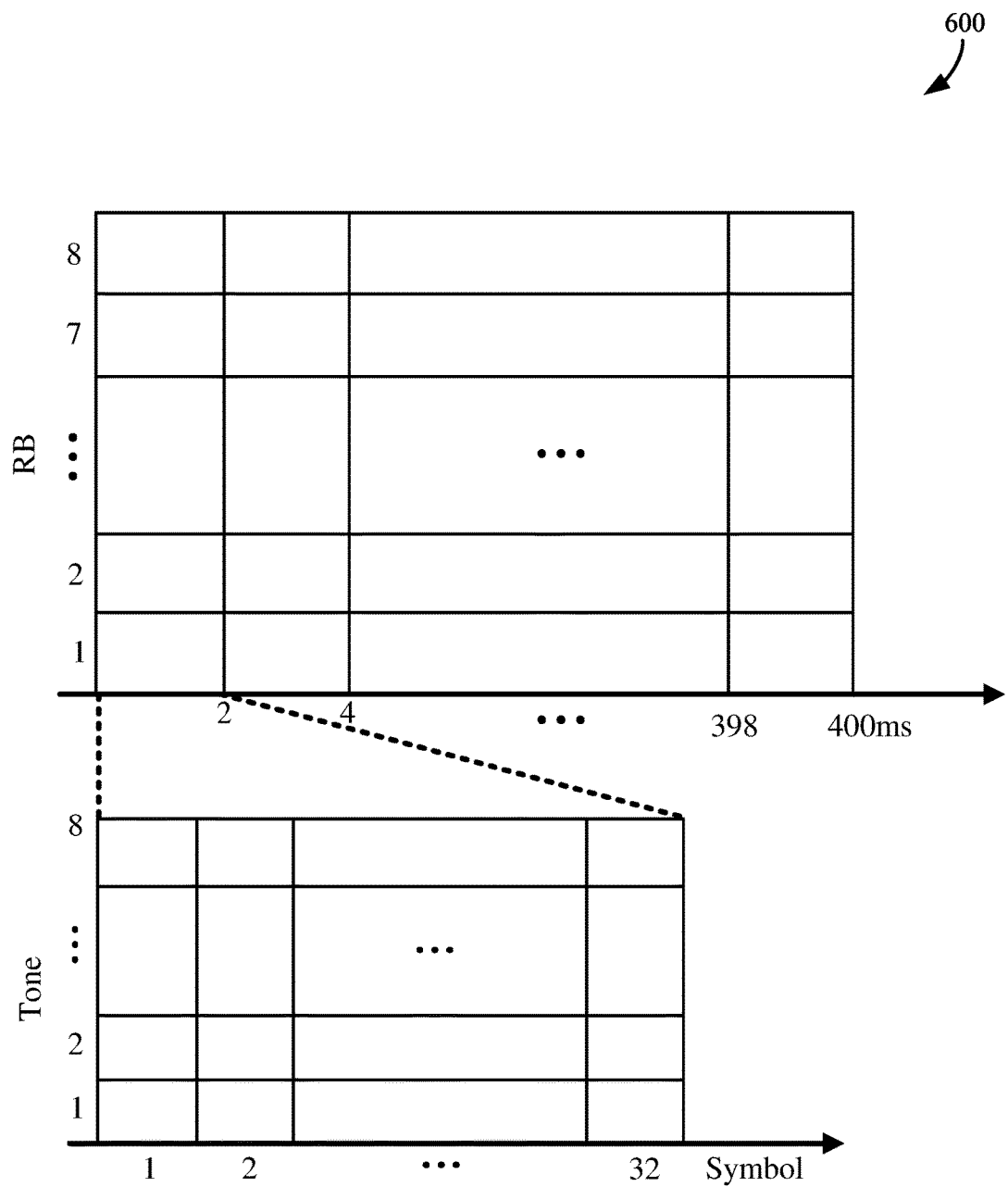
FIG. 6 is a diagram illustrating an example of a discovery frame in accordance with some aspects of the present disclosure.

FIG. 6 is a diagram 600 illustrating an example of a discovery frame in accordance with some aspects of the present disclosure. Although some specific examples may be provided herein with reference to the discovery frame illustrated in FIG. 6, one of ordinary skill in the art will understand that such examples are provided for illustrative purposes and are not intended to necessarily limit the scope of the present disclosure. Additional or alternative examples of any details provided with reference to the discovery frame illustrated in FIG. 6 may exist without necessarily deviating from the scope of the present disclosure. The non-limiting example of the discovery frame illustrated in FIG. 6 includes eight resource blocks (RBs) in each slot. The duration of each slot may be 2 milliseconds (ms) or 32 symbols. Each RB may have eight tones. The bandwidth of the communication channel may be 1.15 Megahertz (MHz). The subcarrier spacing may be approximately 18 Kilohertz (KHz). The cyclic prefix (CP) duration may be approximately 6.94 microseconds (μs). The OFDM symbol duration may be approximately 62.5 μs. The fast Fourier transform (FFT) size may be 64. The modulation and coding scheme (MCS) may be quadrature phase shift keying (QPSK) with a rate of ½. The number of relays in a two-hop neighborhood may be approximately 1,000, which may provide support for approximately $10^5$ devices, where approximately 10% may operate as relays. In this example, the discovery frame may have approximately 200 slots and duration of approximately 400 ms.

Figure 7:
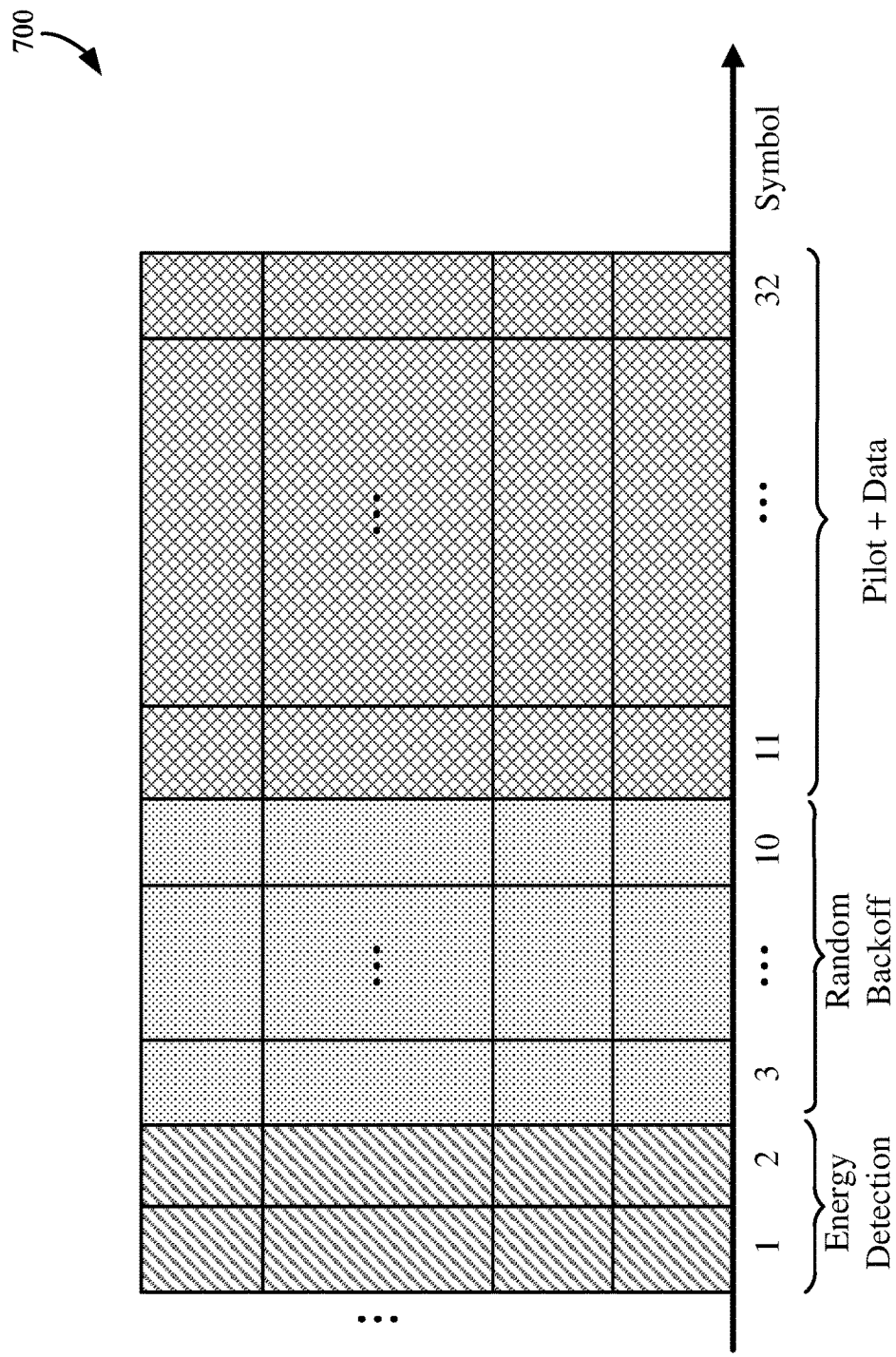
FIG. 7 is a diagram illustrating an example of a resource block (RB) in a slot of a first discovery frame according to some aspects of the present disclosure.

FIG. 7 is a diagram 700 illustrating an example of a RB in a slot (e.g., 32 symbols) of a first discovery frame (e.g., $F_1$ in FIG. 5) according to some aspects of the present disclosure. A first portion of the slot (e.g., symbols 1-10) may be utilized for reservation and contention resolution. In the non-limiting example illustrated in FIG. 7, symbols 1-2 are utilized, generally, for reservation of discovery resources, and symbols 3-10 are utilized, generally, for contention resolution. During symbols 1-2, energy detection is performed. This portion of the slot (e.g., symbols 1-2) may sometimes be referred to as a new transmission time (e.g., new broadcast time (NBT)) and/or various other suitable terms without necessarily deviating from the scope of the present disclosure. For example, UE$_1$ 128 may monitor (e.g., listen) during this portion of the slot (e.g., symbols 1-2) to determine whether energy above a threshold is detected for a discovery resource. Generally, a discovery resource refers to a radio resource (e.g., a particular frequency range, communication channel, etc.) that may be utilized by one UE to discover the presence and/or capabilities of another UE.

One of ordinary skill in the art will appreciate that the aforementioned threshold (for energy detection) may vary among different implementations without necessarily deviating from the scope of the present disclosure. If energy above a threshold is detected for the discovery resource, then UE$_1$ 128 may determine that the discovery resource is unavailable for communication (e.g., because it is being utilized by another UE) and thereafter refrain from using that discovery resource. On the other hand, if energy above a threshold is undetected for the discovery resource, then UE$_1$ 128 may determine that that discovery resource is available for communication. The discovery resource may be 'available for communication' when the discovery resource is not currently occupied by, utilized for, and/or reserved for a communication (e.g., by another UE).

A non-limiting example of such a communication is a discovery signal. A 'discovery signal' may refer to various forms of signal(s) without necessarily deviating from the scope of the present disclosure. In some examples, the discovery signal may be a broadcast signal (e.g., a discovery broadcast), a multicast signal (e.g., a discovery multicast) and/or various other suitable forms of signal(s). Although some non-limiting examples are provided herein with reference to a 'discovery broadcast,' one of ordinary skill in the art will understand that such a 'discovery broadcast' may alternatively be any of the aforementioned forms of signal(s) without necessarily deviating from the scope of the present disclosure.

A discovery broadcast may include pilot(s) and data, as indicated in FIG. 7. The data may include information indicating various capabilities of $UE_1$ 128, such as the capability of $UE_1$ 128 to operate as a relay for other UEs, such as $UE_2$ 140. In the example illustrated in FIG. 7, the discovery broadcast may have a duration of 22 symbols (e.g., symbols 11-32). The data may also include other information, such as an address (e.g., a 64-bit address) of the UE, cyclic redundancy check (CRC) information (e.g., a 16-bit CRC), and various parameters. These parameters may relate to the sleep/awake state(s), such as the sleep/awake duty cycle, transmission offset, and/or other suitable information related to the sleep/awake state(s). These parameters may additionally or alternatively relate to energy, such as battery level, energy rate, marginal energy cost, and/or other suitable information related to energy. These parameters may additionally or alternatively relate to latency, such as number of hops to the base station (e.g., eNB), delay information, and/or other suitable information related to latency.

However, before communicating a discovery broadcast, $UE_1$ 128 may initiate a random backoff timer. In the example illustrated in FIG. 7, the duration of the random backoff is eight symbols (e.g., symbols 3-10), but one of ordinary skill in the art will understand that this is a non-limiting example and various alternative durations may be implemented without deviating from the scope of the present disclosure. Until the expiration of the random backoff timer, $UE_1$ 128 may refrain from utilizing the discovery resource and monitor (e.g., listen to) that discovery resource to determine whether energy above a threshold is detected.

If energy above a threshold is detected before expiration of the random backoff timer (e.g., during symbols 3-10), then $UE_1$ 128 may determine that the discovery resource is unavailable (e.g., because it is being utilized by another UE) and thereafter refrain from using the discovery resource to communicate a discovery broadcast. On the other hand, if energy above a threshold is undetected before expiration of the random backoff timer (e.g., during symbols 3-10), then $UE_1$ 128 may determine that the discovery resource is available for communication (e.g., because it is not being utilized by another UE) and thereafter initiate communication of the discovery broadcast using the discovery resource.

Figure 8:
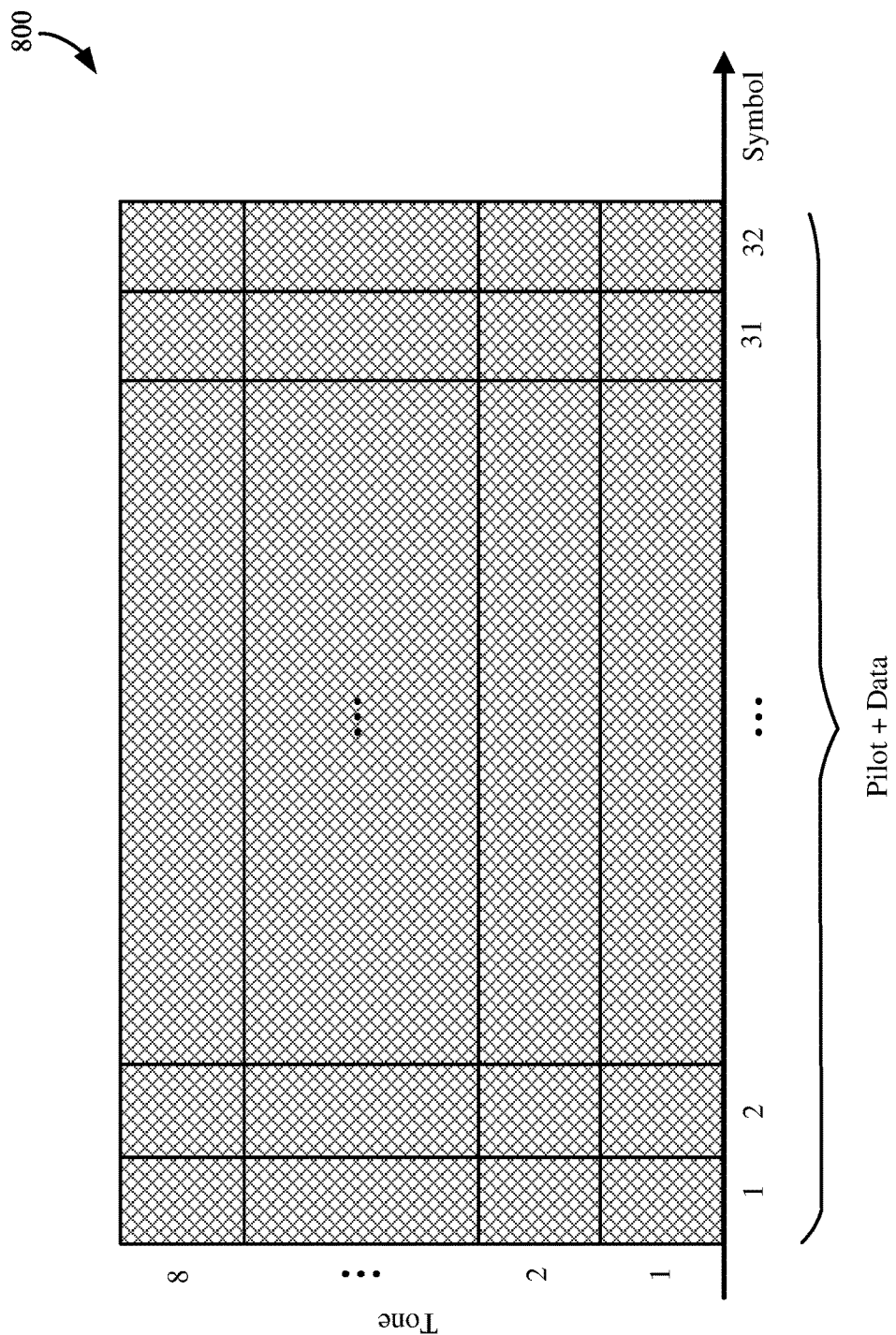
FIG. 8 is a diagram illustrating an example of a RB in a slot of a second discovery frame according to some aspects of certain existing systems.

FIG. 8 is a diagram 800 illustrating an example of a RB in a slot (e.g., 32 symbols) of a second discovery frame (e.g., $F_{D+1}$ in FIG. 5) according to some aspects of certain existing systems. Because $UE_1$ 128 determined that the discovery resource is available for communication (e.g., because it is not being utilized by another UE), $UE_1$ 128 may begin to communicate information (e.g., pilot and data) throughout the entirety of that slot (e.g., symbols 1-32). Notably, in such existing systems, $UE_1$ 128 will not perform energy detection as was done during the first discovery frame (e.g., $F_{D+1}$ in FIG. 5), as described above with reference to FIG. 6.

However, such existing systems may have some drawbacks and/or limitations under certain circumstances. A non-limiting example of such a circumstance is when $UE_1$ 128 uses a random backoff timer having a duration that is the same as a duration of a random backoff timer of another UE (e.g., $UE_2$ 140). When two (or more) UEs (e.g., $UE_1$ 128, $UE_2$ 140), perhaps by chance, utilize the same duration for their respective random backoff timers, those UEs (e.g., $UE_1$ 128, $UE_2$ 140) may inadvertently arrive at the incorrect determination that the discovery resource is available for communication and thereafter all communicate discovery broadcasts using the same discovery resource at the same time (e.g., during the second discovery frame illustrated in FIG. 8, which may be $F_{D+1}$ at $T_{D+1}$ in FIG. 5). (In part, this may be because their discovery procedures are not aided by explicitly feedback mechanisms (e.g., request-to-send (RTS)/request-to-send (CTS) protocols).) Ultimately, such circumstances can result in a collision of the discovery broadcasts communicated by those UEs (e.g., $UE_1$ 128, $UE_2$ 140). While these collisions may (or may not) be detected by other UEs (e.g., $UE_3$ 138, $UE_4$ 142), these collisions will not be detect by those UEs (e.g., $UE_1$ 128, $UE_2$ 140) because those two UEs (e.g., $UE_1$ 128, $UE_2$ 140) are operating under an erroneous assumption that the discovery resource is available for use. Accordingly, the collisions will persist over time, thereby leading to a scenario sometimes referred to as a collision deadlock.

Figure 9:
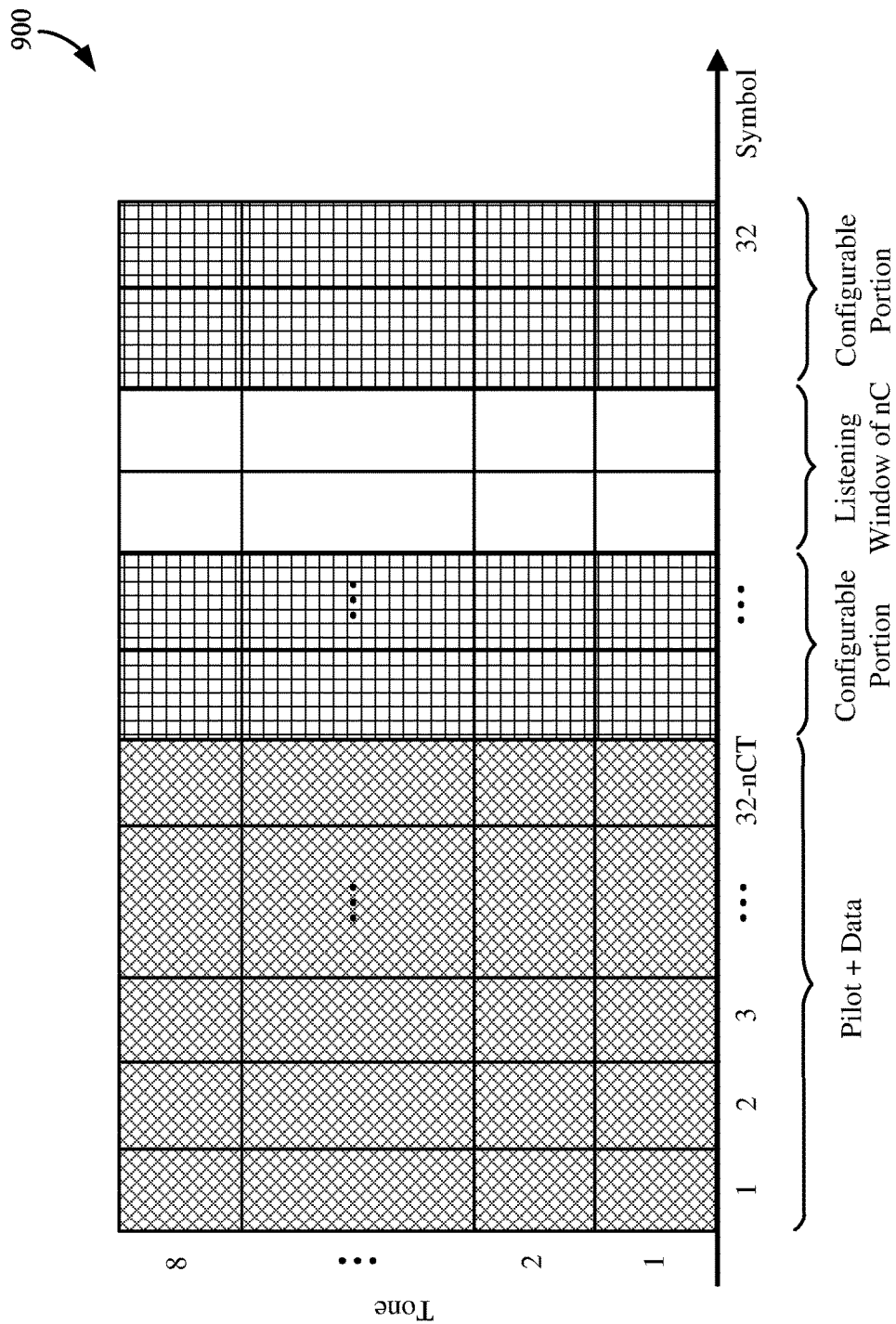
FIG. 9 is a diagram illustrating an example of a RB in a slot of a second discovery frame according to some aspects of the present disclosure.

FIG. 9 is a diagram 900 illustrates an example of a RB in a slot (e.g., 32 symbols) of a second discovery frame (e.g., $F_{D+1}$ in FIG. 5) according to some aspects of the present disclosure. To avoid or resolve a collision deadlock, as described in greater detail above with reference to FIG. 8, aspects of the present disclosure provide for a listening window during a portion of the second discovery frame (e.g., $F_{D+1}$ in FIG. 5), as illustrated in FIG. 9. For example, a UE (e.g., $UE_1$ 128) may puncture (e.g., cease, interrupt, pause, or otherwise alter transmission of) a discovery broadcast in order to provide the listening window.

Generally, a 'listening window' may refer to any duration of time and/or number of symbols during which a UE (e.g., $UE_1$ 128) can detect, measure, and/or otherwise listen for received signal energy. In some examples, the listening window may refer to a duration of time and/or number of symbols during which the UE (e.g., $UE_1$ 128) is not transmitting signals and instead is determining whether received signal energy above a threshold is detected. One of ordinary skill in the art will understand that the 'duration' of the listening window may also be referred to as the 'size' of the listening window without necessarily deviating from the scope of the present disclosure. In the example illustrated in FIG. 9, the listening window has a duration corresponding to nC symbols. The term 'nC' refers to the number of symbols of the listening window. Without deviating from the scope of the present disclosure, the term 'nC' may be interchangeable with any other variable, placeholder, abbreviation, and/or identifier that refers to the number of symbols in the listening window. In other words, of the 32 symbols in that slot, the nC symbols are punctured and used for the listening window. One of ordinary skill in the art will understand that the value of nC may be any value less than 32 symbols, at least with respect to the example illustrated in FIG. 9. In some examples, the listening window (e.g., the nC symbols) may include or be included in any switch-over gap or guard period between transmission-reception transitions.

The periodicity of the listening window may vary without necessarily deviating from the scope of the present disclosure. In other words, whether the listening window exists in one or more second discovery frames (e.g., $F_{D+1}$ in FIG. 5) may vary based on various factors without necessarily deviating from the scope of the present disclosure. In some example, the listening window may exist in every second discovery frame (e.g., $F_{D+1}$ in FIG. 5). In some examples, the listening window may exist in only every $p^{th}$ discovery frame, where p is any positive integer. In some examples, the listening window may exist in a particular second discovery frame (e.g., $F_{D+1}$ in FIG. 5) based on a probability P, wherein P can have any value within the range of zero through one. In some examples, the periodicity of the listening window may refer to how frequently a discovery frame including the listening window occurs over an interval or period of time. In some examples, the periodicity of the listening window may refer to a value computed by considering the number of discovery frames that include the listening window relative to the total number of discovery frames (e.g., over an interval or period of time).

According to some aspects of the present disclosure, the periodicity of the listening window may be associated with a likelihood of a collision deadlock. Generally, the likelihood of a collision deadlock may be based on the number of other UEs that are within the communication range of that UE. A relative increase in the number of other UEs contending for a fixed quantity of discovery resources may increase the relative likelihood of two (or more) UEs selecting the same discovery resource and the same random backoff duration/timer, thereby increasing the relative likelihood of a collision deadlock. Therefore, the likelihood of a collision deadlock is relatively high when a relatively greater number of other UEs are within the communication range of that UE, and the likelihood of a deadlock collision is relatively low when a relatively fewer number of other UEs are within the communication range of that UE.

If energy above a threshold is detected during the listening window, then the UE (e.g., $UE_1$ 128) can determine that the UE (e.g., $UE_1$ 128) may be in a collision deadlock with another UE (e.g., $UE_2$ 140). In some cases, the UE (e.g., $UE_1$ 128) may determine to abandon that particular discovery resource, because resuming use of that discovery resource may simply result in continued collision with transmissions from another UE (e.g., $UE_2$ 140). Generally, the term 'abandon' may refer to the non-use, desertion, and/or disregard of something (e.g., the discovery resource). Afterwards, the UE (e.g., $UE_1$ 128) may select another discovery resource and determine whether that other discovery resource is available for communication.

By using the listening window, the UE (e.g., $UE_1$ 128) is able to overcome the collision deadlock that would otherwise likely persist. Put another way, without the listening window, the UE (e.g., $UE_1$ 128) would be unable to effectively communicate using that discovery resource because its communications would be in potentially perpetual collision with communications of another UE (e.g., $UE_2$ 140), because both UEs (e.g., $UE_1$ 128, $UE_2$ 140) would be unable to determine that another UE was utilizing the same discovery resources.

The second discovery frame (e.g., $F_{D+1}$ in FIG. 5) may also include one or more configurable portions, which are noted as such in FIG. 9. In some configurations, some or all of the configurable portions may include data and/or pilot(s). In some configurations, some or all of the configurable portions may include other types of information, such as preselected or predefined sequences or other information. One of ordinary skill in the art will understand that such configurable portions may have various contents and/or various durations without necessarily deviating from the scope of the present disclosure. In the example illustrated in FIG. 9, these configurable portions occur before and after the listening window, but alternative configurations exist and are within the scope of the present disclosure. The total number of symbols occupied by the combination of the listening window and the configurable portions are the nCT symbols, where the value of nC is less than the value of nCT (i.e., the nC symbols is less than the nCT symbols). The term 'nCT' refers to the total number of symbols (in the discovery frame) from which the number of symbols of the listening window (e.g., 'nC symbols') may be selected. Without deviating from the scope of the present disclosure, the term 'nCT' may be interchangeable with any other variable, placeholder, abbreviation, and/or identifier that refers to the total number of symbols (in the discovery frame) from which the number of symbols of the listening window (e.g., 'nC symbols') may be selected.

In the example illustrated in FIG. 9, the discovery broadcast occupies the remaining portion of the second discovery frame (e.g., $F_{D+1}$ in FIG. 5). In this example, the number of symbols for the discovery broadcast is 32–nCT. In other words, the discovery broadcast (e.g., data and pilot(s)) can utilize 32–(nCT symbols). In some aspects of the present disclosure, the discovery broadcast (e.g., data and pilot(s)) is communicated in a portion of the second discovery frame (e.g., $F_{D+1}$ in FIG. 5) that is before the listening window. Put another way, the listening window occurs in a portion of the second discovery frame (e.g., $F_{D+1}$ in FIG. 5) that is after the discovery broadcast (e.g., data and pilot(s)). Such an arrangement may be beneficial for communication because the first symbol may already be implicitly reserved (e.g., implicitly prioritized) for data and pilot(s), at least based on the energy detection and random backoff procedures of the first discovery frame (e.g., $F_1$ in FIG. 5). Accordingly, this structure minimizes any disruption to the expectations of the receiving devices, which may be expecting to receive data and pilot(s) in the first few symbols of the second discovery frame (e.g., $F_{D+1}$ in FIG. 5).

There may sometimes occur a possibility that two (or more) UEs (e.g., $UE_1$ 128, $UE_2$ 140) will utilize the same symbols for their listening window, thereby obviating any potential benefits (of resolving collision deadlocks) because both UEs (e.g., $UE_1$ 128, $UE_2$ 140) would not be transmitting at the same time and, therefore, unable to determine that the other UE is using the same discovery resource. However, aspects of the present disclosure provide for features that may allow such collision deadlocks to be resolved in time (e.g., in subsequent discovery frames).

For example, in some configurations, the listening window may have a fixed duration but a beginning (e.g., starting symbol) that is randomly selected from a predetermined set of values. Generally, listening windows may have a 'fixed duration' when those listening windows have a predetermined, preset, unchanging, static, and/or same length/duration of time and/or number of symbols. Even if two (or more) UEs (e.g., $UE_1$ 128, $UE_2$ 140), perhaps by chance, select the exact same symbols for their respective listening windows in one second discovery frame (e.g., $F_{D+1}$ in FIG. 5), it is unlikely that those same UEs (e.g., $UE_1$ 128, $UE_2$ 140) will continue to always select the exact same symbols for their respective listening windows (because the selection will be random, as mentioned above). Therefore, one UE will eventually detect energy above a threshold during their listening window and thereby conclude that another UE is also using that discovery resource, after which that UE may abandon that discovery resource, which would resolve the collision deadlock.

Figure 10:
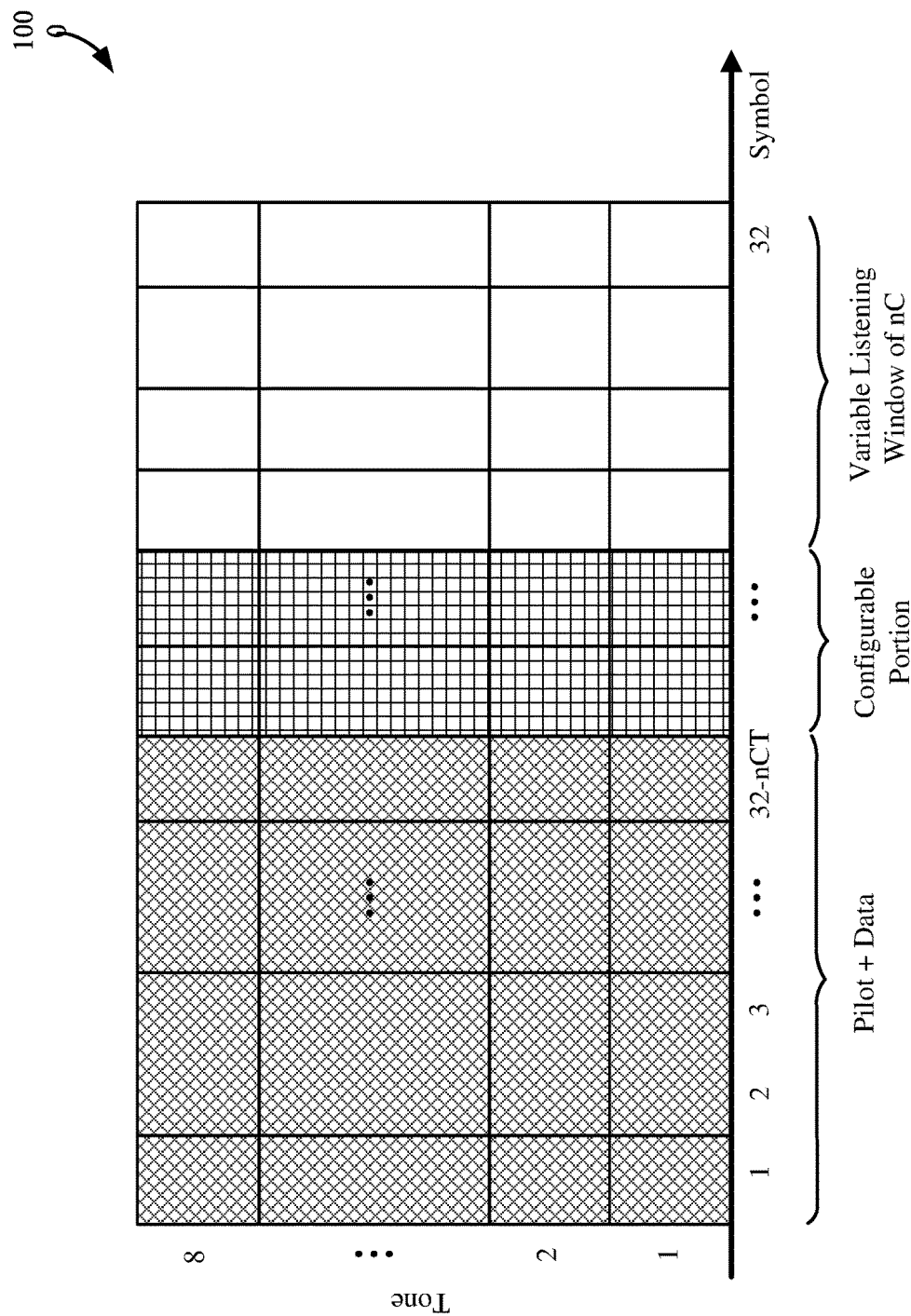
FIG. 10 is a diagram illustrating an example of another RB in a slot of a second discovery frame according to some aspects of the present disclosure.

FIG. 10 is a diagram 1000 illustrating another example of a RB in a slot (e.g., 32 symbols) of a second discovery frame (e.g., $F_{D+1}$ in FIG. 5) according to some aspects of the present disclosure. Various aspects illustrated in FIG. 10 are described above with reference to FIG. 9 and therefore will not be repeated. As mentioned above, there may sometimes occur a possibility that two (or more) UEs (e.g., $UE_1$ 128, $UE_2$ 140) will utilize the same symbols for their listening window, thereby obviating any potential benefits (of resolving collision deadlocks) because both UEs (e.g., $UE_1$ 128, $UE_2$ 140) would not be transmitting at the same time and, therefore, unable to determine that the other UE is using the same discovery resource. However, aspects of the present disclosure provide for features that may allow such collision deadlocks to be resolved in time (e.g., in subsequent discovery frames).

For example, in some configurations, the listening window may have a variable duration but an end that matches the end of the second discovery frame (e.g., $F_{D+1}$ in FIG. 5), as illustrated in the example provided in FIG. 10. Generally, listening windows may have a 'variable duration' when those listening windows have a changeable, adjustable, dynamic, configurable, flexible, alterable, diverse, dissimilar, and/or different length/duration of time and/or number of symbols. Even if two (or more) UEs (e.g., $UE_1$ 128, $UE_2$ 140), perhaps by chance, select the exact same symbols for their respective listening windows in one second discovery frame (e.g., $F_{D+1}$ in FIG. 5), it is unlikely that those same UEs (e.g., $UE_1$ 128, $UE_2$ 140) will continue to always select the exact same symbols for their respective listening windows (because the duration of the listening window is variable, as mentioned above). Therefore, one UE will eventually detect energy above a threshold during their listening window and thereby conclude that another UE is also using that discovery resource, after which that UE may determine to abandon that discovery resource, which would resolve the collision deadlock.

As explained in greater detail above, if two (or more) UEs (e.g., $UE_1$ 128, $UE_2$ 140) utilize the same duration for their random backoff timer during the first discovery frame (e.g., $F_D$ in FIG. 5), those two (or more) UEs (e.g., $UE_1$ 128, $UE_2$ 140) can utilize the listening window during the second discovery frame (e.g., $F_{D+1}$ in FIG. 5) to resolve any collision deadlock. Because the listening window illustrated in FIG. 10 has a variable duration, the UE (e.g., $UE_1$ 128) having a listening window with a duration that is shorter than the duration of the listening window of the other UE (e.g., $UE_2$ 140) will not detect any transmission from the other UE (e.g., $UE_2$ 140) and, therefore, determine to continue using the discovery resource. In comparison, however, the UE (e.g., $UE_2$ 140) having a listening window with a duration that is longer than the duration of the listening window of the other UE (e.g., $UE_1$ 128) will detect the transmission from the other UE (e.g., $UE_1$ 128) and, therefore, determine to abandon that discovery resource. Consequently, the UE (e.g., $UE_1$ 128) having a listening window with a duration that is shorter than the duration of the listening window of the other UE (e.g., $UE_2$ 140) will implicitly have a higher priority to that discovery resource relative to the other UE (e.g., $UE_2$ 140). In the unlikely event that two (or more) UEs (e.g., $UE_1$ 128, $UE_2$ 140) utilize the same duration for a particular second discovery frame (e.g., $F_{D+1}$ in FIG. 5), the collision deadlock will eventually be resolved in subsequent discovery frames because the durations of these listening windows will eventually differ for the two (or more) UEs (e.g., $UE_1$ 128, $UE_2$ 140).

Figure 11:
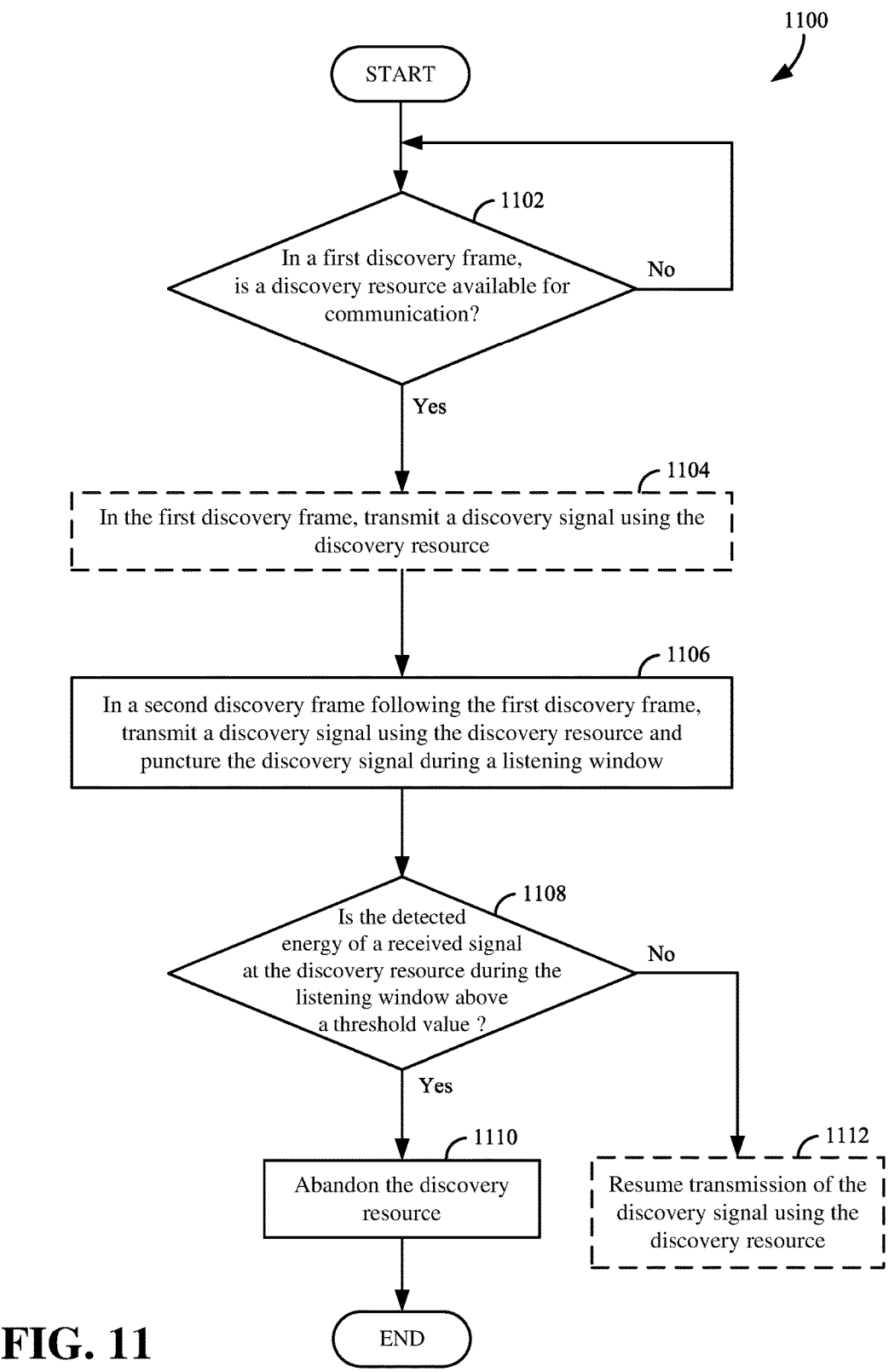
FIG. 11 is a diagram illustrating examples of various methods and/or processes according to some aspects of the present disclosure.

FIG. 11 is a diagram 1100 illustrating examples of various methods and/or processes according to some aspects of the present disclosure. Such methods and/or processes may be performed by various apparatuses without necessarily deviating from the scope of the present disclosure. In some configurations, such methods and/or processes may be performed by a UE (e.g., $UE_1$ 128, $UE_2$ 140) described herein. At block 1102, the UE may, in a first discovery frame, determine whether a discovery resource is available for communication. For instance, the UE may determine whether energy above a threshold is detected at the discovery resource during an initial portion of the first discovery frame. For example, referring to FIG. 7, the UE may determine whether energy above a threshold is detected during symbols 1-2 and/or during symbols 3-10 of the first discovery frame (which may be included in, e.g., $F_D$ in FIG. 5). If the discovery resource is available for communication, at block 1104, the UE may transmit a discovery signal in the first discovery frame using the discovery resource. For example, referring to FIG. 7, the UE may transmit a discovery signal during symbols 11-32 of the discovery frame. As described in greater detail above, non-limiting examples of a discovery signal include a discovery broadcast, a discovery multicast, and/or various other suitable forms of signal(s).

Further, because the discovery resource is available for communication, at block 1106, the UE may, in a second discovery frame following the first discovery frame, transmit a discovery signal using the discovery resource and puncture the discovery signal during a listening window. For example, referring to FIG. 9, the UE may use the discovery resource for a discovery signal (e.g., using symbols 1 through (32−nCT)) and puncture the discovery signal for the nC symbols of the listening window. In some configurations, the listening window may have a fixed duration and a beginning that is randomly selected from a predetermined set of values. In some configurations, the listening window may have a variable duration and an end that matches an end of the second discovery frame. In some configurations, the listening window occurs after a data portion of the second discovery frame.

At block 1108, the UE may detect the energy of a received signal at the discovery resource during the listening window. At block 1108, the UE may also determine whether the detected energy of the received signal at the discovery resource during the listening window is above a threshold. For example, referring to FIG. 9, the UE may determine whether energy above a threshold is detected during the nC symbols of the listening window. If the detected energy is above the threshold, at block 1110, the UE may abandon that discovery resource. The UE may abandon that discovery resource because the UE may determine that another UE is using that discovery resource, thereby resolving an otherwise-likely collision deadlock scenario. Alternatively, if the detected energy is not above the threshold, at block 1112, the UE may resume the transmission of the discovery signal using the discovery resource. The UE may resume the transmission of the discovery signal because the UE may determine that another UE is not using that discovery resource.

Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, the method comprising:
   in a first discovery frame, determining whether a discovery resource corresponding to a particular communication channel is available for communication;
   if the discovery resource is available for communication, in each of two second discovery frames following the first discovery frame, transmitting a discovery signal using the discovery resource and puncturing the discovery signal during a listening window, wherein a duration of time or number of symbols of the listening window in a first of the two second discovery frames is different from the duration of time or number of symbols of the listening window in a second of the two second discovery frames;
   detecting an energy of a received signal at the discovery resource during the listening window; and
   abandoning the discovery resource if the detected energy is above a first threshold.

2. The method of claim 1, wherein the listening window further comprises:
   an end that matches an end of the second discovery frame.

3. The method of claim 1, wherein the listening window occurs after a data portion of the second discovery frame.

4. The method of claim 1, wherein the determining whether the discovery resource is available for communication comprises:
   determining whether energy above a second threshold is detected at the discovery resource during an initial portion of the first discovery frame.

5. The method of claim 1, further comprising:
   resuming the transmitting of the discovery signal using the discovery resource if the detected energy is not above the first threshold.

6. The method of claim 1, wherein the discovery signal comprises at least one of a discovery broadcast or a discovery multicast.

7. The method of claim 1, wherein the transmitting, detecting and abandoning are performed by a first communication device in accordance with a periodicity of the listening window, which periodicity is based on the number of other communication devices within communication range of the first communication device.

8. An apparatus for wireless communication, the apparatus comprising:
   a processor;
   a transceiver communicatively coupled to the processor; and
   a memory communicatively coupled to the processor, wherein the processor is configured to:
   in a first discovery frame, determine whether a discovery resource corresponding to a particular communication channel is available for communication;
   if the discovery resource is available for communication, in each of two second discovery frames following the first discovery frame, transmit a discovery signal using the discovery resource and puncture the discovery signal during a listening window, wherein a duration of time or number of symbols of the listening window in a first of the two second discovery frames is different from the duration of time or number of symbols of the listening window in a second of the two second discovery frames;

detect an energy of a received signal at the discovery resource during the listening window; and abandon the discovery resource if the detected energy is above a first threshold.

9. The apparatus of claim 8, wherein the listening window further comprises:

an end that matches an end of the second discovery frame.

10. The apparatus of claim 8, wherein the listening window occurs after a data portion of the second discovery frame.

11. The apparatus of claim 8, wherein the determining whether the discovery resource is available for communication comprises:

determining whether energy above a second threshold is detected at the discovery resource during an initial portion of the first discovery frame.

12. The apparatus of claim 8, wherein the processor is further configured to:

resume to transmit the discovery signal using the discovery resource if the detected energy is not above the first threshold.

13. The apparatus of claim 8, wherein the discovery signal comprises at least one of a discovery broadcast or a discovery multicast.

14. The apparatus of claim 8, wherein the processor is further configured to transmit, detect and abandon in accordance with a periodicity of the listening window, which periodicity is based on the number of other apparatuses within communication range of the apparatus.

15. A non-transitory computer-readable medium storing computer-executable code comprising instructions configured to:

in a first discovery frame, determine whether a discovery resource corresponding to a particular communication channel is available for communication;

if the discovery resource is available for communication, in each of two second discovery frames following the first discovery frame, transmit a discovery signal using the discovery resource and puncture the discovery signal during a listening window, wherein a duration of time or number of symbols of the listening window in a first of the two second discovery frames is different from the duration of time or number of symbols of the listening window in a second of the two second discovery frames;

detect an energy of a received signal at the discovery resource during the listening window; and abandon the discovery resource if the detected energy is above a first threshold.

16. The non-transitory computer-readable medium of claim 15, wherein the listening window further comprises:

an end that matches an end of the second discovery frame.

17. The non-transitory computer-readable medium of claim 15, wherein the listening window occurs after a data portion of the second discovery frame.

18. The non-transitory computer-readable medium of claim 15, wherein the determining whether the discovery resource is available for communication comprises:

determining whether energy above a second threshold is detected at the discovery resource during an initial portion of the first discovery frame.

19. The non-transitory computer-readable medium of claim 15, wherein the instructions are further configured to:

resume the transmitting of the discovery signal using the discovery resource if the detected energy is not above the first threshold.

20. The non-transitory computer-readable medium of claim 15, wherein the discovery signal comprises at least one of a discovery broadcast or a discovery multicast.

21. The non-transitory computer-readable medium of claim 15, wherein the computer-readable medium is associated with a communication device, and the computer-executable code further comprises instructions configured to transmit, detect and abandon in accordance with a periodicity of the listening window, which periodicity is based on the number of other communication devices within communication range of the communication device.

22. An apparatus for wireless communication, the apparatus comprising:

means for, in a first discovery frame, determining whether a discovery resource corresponding to a particular communication channel is available for communication;

if the discovery resource is available for communication, means for transmitting, in each of two second discovery frames following the first discovery frame, a discovery signal using the discovery resource and puncturing the discovery signal during a listening window;

means for detecting an energy of a received signal at the discovery resource during the listening window, wherein a duration of time or number of symbols of the listening window in a first of the two second discovery frames is different from the duration of time or number of symbols of the listening window in a second of the two second discovery frames; and means for abandoning the discovery resource if the detected energy is above a first threshold.

23. The apparatus of claim 22, wherein the listening window further comprises:

an end that matches an end of the second discovery frame.

24. The apparatus of claim 22, wherein the listening window occurs after a data portion of the second discovery frame.

25. The apparatus of claim 22, wherein the means for determining whether the discovery resource is available for communication is configured to:

determine whether energy above a second threshold is detected at the discovery resource during an initial portion of the first discovery frame.

26. The apparatus of claim 22, further comprising:

means for resuming the transmitting of the discovery signal using the discovery resource if the detected energy is not above the first threshold.

* * * * *